C. H. BARKER.
ATTACHMENT TO SHEAF LOADERS.
APPLICATION FILED MAY 4, 1914.
1,145,878.
Patented July 13, 1915.
2 SHEETS—SHEET 1.
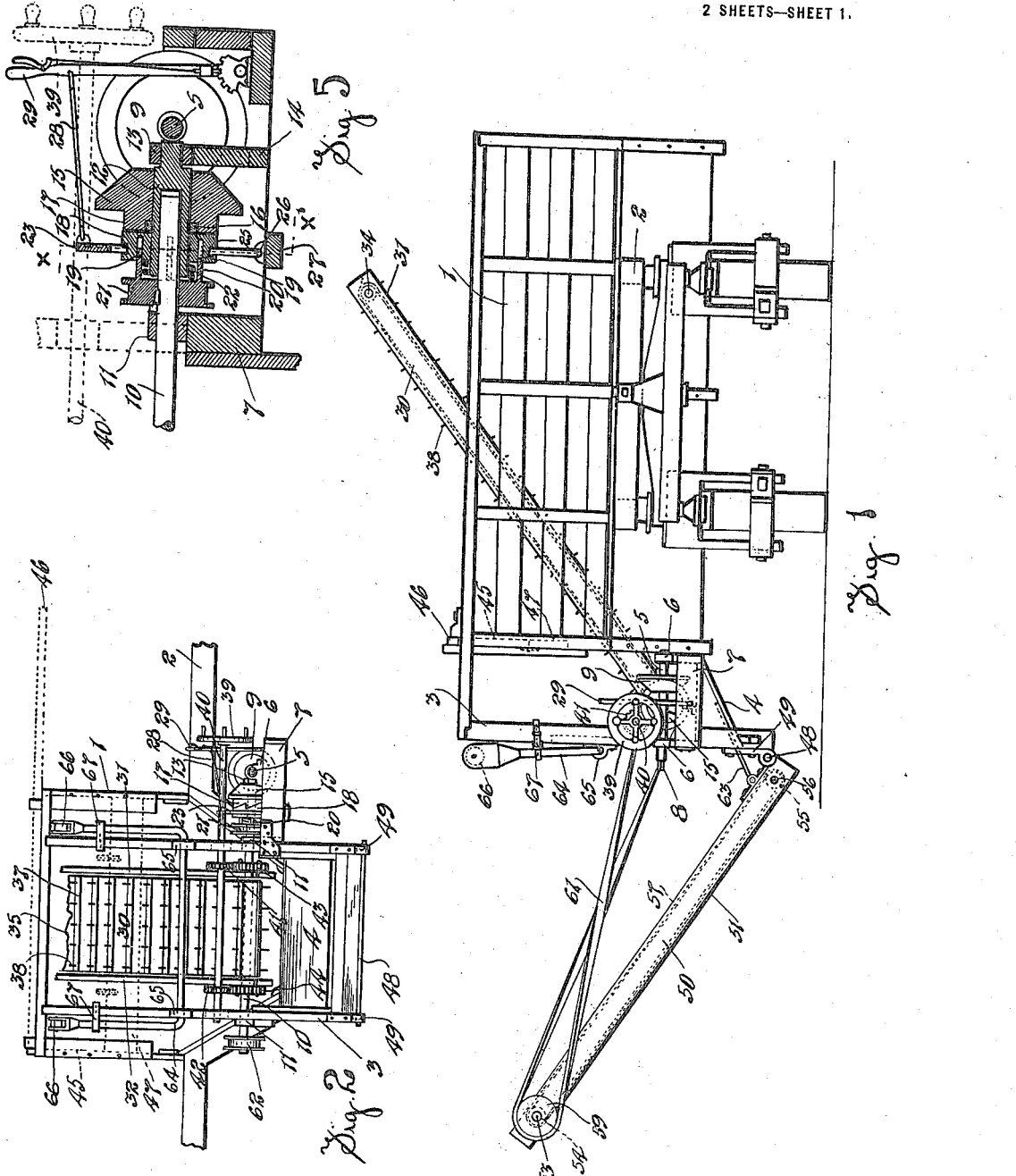
WITNESSES
INVENTOR

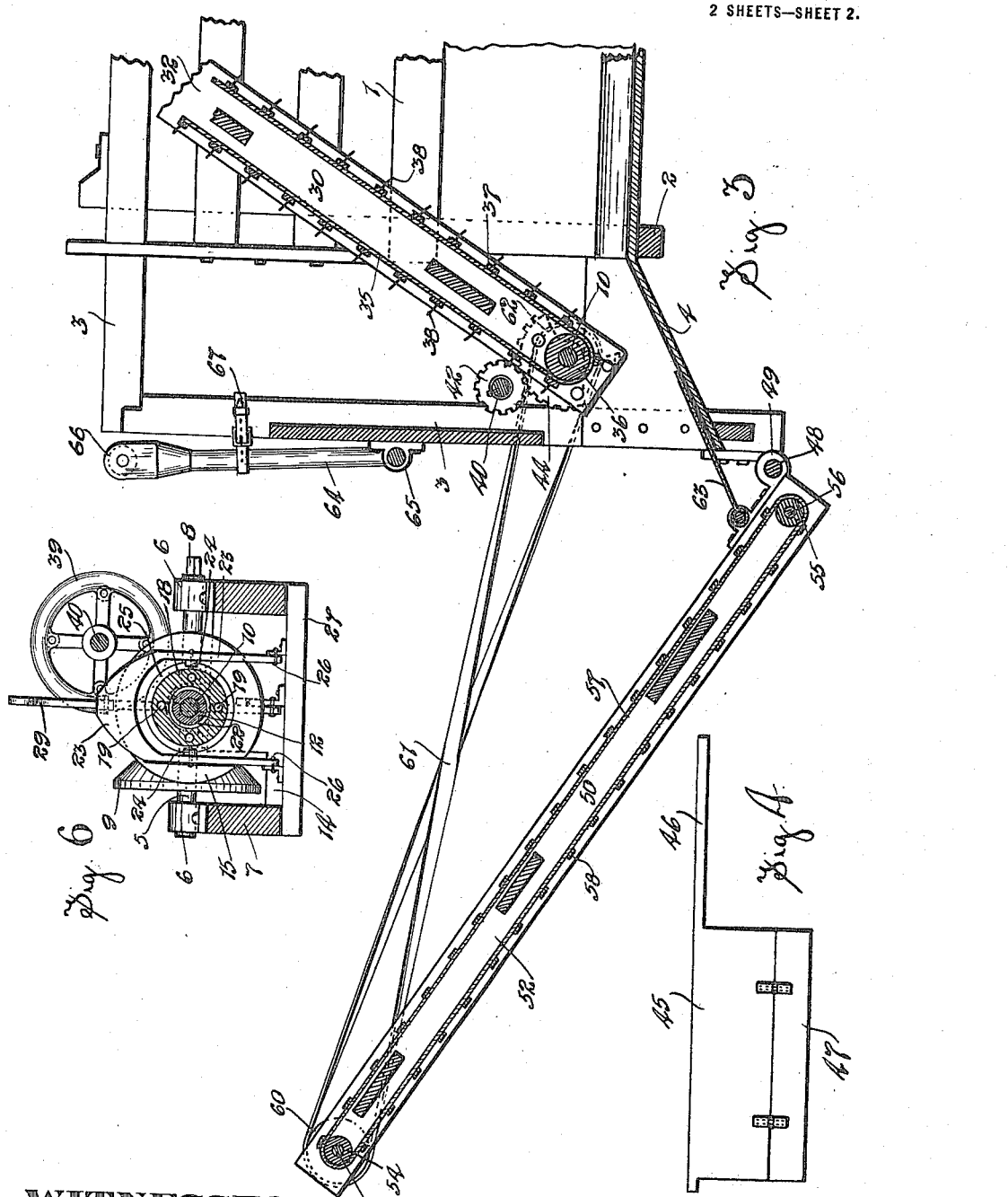

UNITED STATES PATENT OFFICE.

CHARLES HENRY BARKER, OF REGINA, SASKATCHEWAN, CANADA.

ATTACHMENT TO SHEAF-LOADERS.

1,145,878.  Specification of Letters Patent.  Patented July 13, 1915.

Application filed May 4, 1914. Serial No. 836,229.

*To all whom it may concern:*

Be it known that I, CHARLES HENRY BARKER, of the city of Regina, in the Province of Saskatchewan, Canada, have invented certain new and useful Improvements in Attachments to Sheaf-Loaders, of which the following is the specification.

This invention relates to improvements in attachments to sheaf loaders and is in reality an unloading attachment for removing the sheaves or load from a sheaf loader and the object of the invention is to provide an attachment whereby the sheaves forming the load can be swept out of the loader rack and elevated to a point where they can be conveniently dumped into the self feeder of the ordinary grain separator.

With the above object in view the invention consists essentially in a rack having an open end, an adjustable rake mounted in the open end of the rack, an adjustable elevator carried by the rack and designed to receive the material expelled by the rake and means for operating the elevator and rake, the parts being arranged and constructed as hereinafter more particularly described and later pointed out in the appended claim.

Figure 1 represents a side view of the complete device as applied to a sheaf loader. Fig. 2 represents a face view of the rack and attached parts, the elevator being removed to expose construction. Fig. 3 represents an enlarged detailed vertical sectional view through the elevator and a portion of the rack and rake. Fig. 4 represents a side view of the end gate removed from the rack. Fig. 5 represents an enlarged detailed vertical sectional view through the clutch members and adjoining driven parts. Fig. 6 is a vertical sectional view through one of the clutch members, the section being taken in the plane denoted by the line X—X' Fig. 5.

In the drawings like characters of reference indicate corresponding parts in each figure.

I might here explain that in my co-pending application filed under Serial No. 836,227 the 4th day of May, 1914, I have described a sheaf loader in detail wherein the rack for the load of sheaves is disposed across the sheaf loader frame. No means is shown in such application for unloading the sheaves from the rack.

This present application relates purely to an unloading attachment which I have especially designed for the class of sheaf loader shown and described in the above application.

Referring now to the drawings; 1 represents a sheaf receiving rack mounted crosswise on a suitably supported main frame 2, the details of the rack and frame and supporting parts being not herein described in detail as they are fully shown and explained in the co-pending application to which I have already referred. One end of the rack 1 is open and is supplied with an outstanding skeleton frame 3 which carries my unloading attachment.

4 is an inclined chute located at the open end of the rack and forming a continuation of the bottom thereof. The bottom of the rack and the chute can be covered with sheet metal if so desired.

5 is a drive shaft mounted in suitable bearings 6 carried by a box like frame 7 secured to one side of the skeleton frame. One end of the said shaft is squared as indicated at 8 so that the same can be driven or turned by the application of a suitable driving device (not herein described) connected to the squared end of the shaft.

9 is a friction wheel securely fastened to the shaft.

10 is a counter shaft passing across the open end of the rack and having the ends thereof suitably mounted in bearings 11 carried by the skeleton frame.

12 is a short tubular shaft mounted on the forward end of the counter shaft and having one end thereof carried in a bearing 13 mounted on a cross piece 14 passing across the box like frame 7.

15 is a friction wheel rotatably mounted on the tubular shaft and engaging continuously with the friction wheel 9. The friction wheel 15 is prevented from end movement on the tubular shaft by a collar 16 shrunk on the shaft. The hub of the latter friction wheel is formed to present a male clutch member 17 which is designed to engage with a female clutch member 18 freely mounted on the short shaft and fitted with a series of concentrically arranged holes 19 which receive slidably pins 20 projecting from the face of a pulley 21 keyed on the shaft 10 immediately adjoining the inner end of the short shaft. A spiral spring 22 is inserted on the short shaft between the pulley and the female clutch member, this spring having a constant tendency to keep the male and female clutch members engaged, with the result that the counter shaft is driven through the friction wheels, by the drive shaft, the pins 20 effecting the drive connection between the female clutch member and the pulley.

In order that the clutches can be disengaged I have provided a forked member 23 which spans the female clutch member and is supplied with projections 24 received within a circumferentially directed channel 25 formed in the periphery of said clutch member. The lower ends of the forked member are pivotally connected as indicated at 26 to a suitably disposed cross bar 27 carried by the frame 7 while the upper end of the said forked member carries a link 28 connected directly to a controlling lever 29. The lever is supplied with the usual hand latch and detent operating over a suitably located quadrant. One can disengage the clutch members by forcing the lever in a direction toward the counter shaft as will readily be understood.

30 represents a rake mounted on the counter shaft and in the open end of the rack. This rake is formed of an endless belt provided with outstanding prongs and is now described in detail: It comprises suitably connected side members 31 and 32 having the lower ends thereof pivotally mounted on the counter shaft and their upper ends carrying a cross shaft 34 on which I have mounted an endless belt 35 passing around a second roller 36 fixed on the counter shaft. The belt is equipped with cross slats 37 supplied with outstanding teeth 38. Accordingly when the counter shaft is rotated the belt with teeth is operated by the action of the roller 36. The position of the rake within the rack is controlled by a hand wheel 39 located on the forward end of a suitably mounted rod 40, the rod being supplied with pinions 41 and 42 which are designed to mesh continuously with racks 43 and 44 centered on the counter shaft but actually fastened permanently to the side members of the rake. By turning the hand wheel one can raise or lower the outstanding end of the rake. The hand wheel and lever are located within convenient range one to the other so that the attendant can readily control both the position of the rake and the driving thereof. The rake is designed so that when down it will reach the full length of the rack and when swung up to a vertical position will be in reality outside the open end of the rack. In order that the end of the rack can be closed when the rake is not in use, that is when the rack is loading, I have provided a gate 45 which fits between and is suspended from the sides of the rack and is supplied with an extending lever 46 whereby the same can be raised when it is desired to use the rake. The gate is fitted with a flap or hinged portion 47 so that when the same is swung to the upright position the rake can clear past.

48 is a cross rod carried in suitable bearing pieces 49 located on the lower end of the skeleton frame and immediately adjoining the discharge end of the chute 4.

50 is an elevator having the inner end pivotally mounted on the rod. The elevator comprises suitably connected side members 51 and 52 which carry upper and lower cross shafts 53 and 56 fitted with rollers 54 and 55 on which I have mounted a continuous belt 57 supplied with cross slats 58. The cross shaft 53 is supplied with pulleys 59 and 60 connected by means of crossed belts 61, the one with the pulley 21 already referred to and the other with a pulley 62 located on the rear end of the counter shaft. The belts not only serve as a drive for the elevator but they are also arranged in length so that the elevator is held in an inclined position to deliver to the self feeder or the ordinary grain separating machine.

63 is an apron having the lower end pivotally secured to the side members of the elevator and the upper end resting freely on the delivery chute. This apron prevents loose grain from dropping on the ground.

64 is a more or less U-shaped rod carried by suitable bearing pieces 65 secured to the skeleton frame, the said rod having the ends thereof fitted with pulleys 66 which are designed when the rod is turned to engage with the belts. The ends of the said rod are normally fastened in the upright position by means of straps 67 to the skeleton frame.

When the elevator is not in use the straps 67 are undone and the rod is turned to swing the pulleys downwardly to engage the belts. As the elevator is swung upwardly to its storage position the slack in the belts is taken up by the rod. It will be understood that any suitable means such as straps can be used for tying the elevator to the skeleton frame in the storage position.

By equipping a sheaf loader with an open ended rack and an unloading attachment such as that described in this specification it will be seen that the machine with its load can be driven up to a machine such as a grain separator and the load can be unloaded and deposited directly into the self feeder of the separator very quickly and in a short space of time, the whole operation being completely controlled by a single attendant standing at the side of the machine adjoining the hand wheel and lever.

What I claim as my invention is:—

In a device of the class described, a sheaf receiving rack mounted on a suitably supported main frame, one end of said rack being open, a vertical skeleton frame outstanding from said open end of the rack and
5 supported by lateral top and bottom extensions, and means for unloading said rack carried by said skeleton frame.

Signed at Regina, Sask., this 14th day of April, 1914.

CHARLES HENRY BARKER.

In the presence of—
W. HALSEY O. GREEN,
T. W. CASE.

Copies of this patent may be obtained for five cents each, by addressing the "Commissioner of Patents, Washington, D. C."